United States Patent
Artsiom

(10) Patent No.: US 11,513,767 B2
(45) Date of Patent: Nov. 29, 2022

(54) METHOD AND SYSTEM FOR RECOGNIZING A REPRODUCED UTTERANCE

(71) Applicant: YANDEX EUROPE AG, Lucerne (CH)

(72) Inventor: Kanstantsin Yurievich Artsiom, Minsk (BY)

(73) Assignee: YANDEX EUROPE AG, Lucerne (CH)

(*) Notice: Subject to any disclaimer, the term of this patent is extended or adjusted under 35 U.S.C. 154(b) by 215 days.

(21) Appl. No.: 17/095,812

(22) Filed: Nov. 12, 2020

(65) Prior Publication Data

US 2021/0318849 A1    Oct. 14, 2021

(30) Foreign Application Priority Data

Apr. 13, 2020    (RU) .......................... RU2020113388

(51) Int. Cl.
*G10L 15/22*    (2006.01)
*G06F 3/16*    (2006.01)
*G10L 15/26*    (2006.01)

(52) U.S. Cl.
CPC .............. *G06F 3/167* (2013.01); *G10L 15/22* (2013.01); *G10L 15/26* (2013.01); *G10L 2015/223* (2013.01)

(58) Field of Classification Search
CPC .......... G06F 3/167; G10L 15/22; G10L 15/26
See application file for complete search history.

(56) References Cited

U.S. PATENT DOCUMENTS 8,300,820 B2   10/2012 Rhein
9,299,356 B2    3/2016 Wabnik et al.
(Continued)

FOREIGN PATENT DOCUMENTS

CN    109272991 A    1/2019
CN    110070863 A    7/2019
RU      2705769 C1   11/2019

OTHER PUBLICATIONS

Search Report with regard to the counterpart RU Patent Application No. 2020113388 completed Dec. 9, 2021.
(Continued)

*Primary Examiner* — Ibrahim Siddo
(74) *Attorney, Agent, or Firm* — BCF LLP

(57) ABSTRACT

There is provided a method for operating a speaker device able to be activated by receiving and recognizing a predetermined wake up word. The method is executable at a server. The method comprises: capturing, by the speaker device, an audio signal having been generated in a vicinity of the speaker device; retrieving, by the speaker device, a processing filter, the processing filter being indicative of a pre-determined signal augmentation pattern representative of an excluded portion that has been excluded from an originating utterance having the wake up word, the originating utterance to be reproduced by an other electronic device; applying, by the speaker device, the processing filter to determine presence of the pre-determined signal augmentation pattern in the audio signal; based on determining the presence of the pre-determined signal augmentation pattern in the audio signal, determining that the audio signal has been produced by the other electronic device.

25 Claims, 9 Drawing Sheets

(56) References Cited

U.S. PATENT DOCUMENTS

| | | |
|---|---|---|
| 9,626,977 B2 | 4/2017 | Blesser et al. |
| 9,728,188 B1 * | 8/2017 | Rosen .................... G10L 25/51 |
| 9,928,840 B2 | 3/2018 | Sharifi et al. |
| 10,074,364 B1 * | 9/2018 | Wightman ............ G06F 16/316 |
| 10,079,024 B1 | 9/2018 | Bhimanaik et al. |
| 10,147,433 B1 | 12/2018 | Bradley |
| 10,152,966 B1 | 12/2018 | O'Malley et al. |
| 10,276,175 B1 | 4/2019 | Garcia |
| 10,395,650 B2 | 8/2019 | Garcia |
| 2012/0089392 A1 | 4/2012 | Larco et al. |
| 2013/0060571 A1 | 3/2013 | Soemo et al. |
| 2013/0132095 A1 | 5/2013 | Murthi et al. |
| 2017/0110130 A1 | 4/2017 | Sharifi et al. |
| 2017/0287500 A1 | 10/2017 | De Mers et al. |
| 2018/0350376 A1 | 12/2018 | Embleton et al. |
| 2019/0051299 A1 | 2/2019 | Ossowski et al. |
| 2019/0287536 A1 | 9/2019 | Sharifi et al. |
| 2020/0220935 A1 | 7/2020 | Bao |

OTHER PUBLICATIONS

Haitsma et al., "A Highly Robust Audio Fingerprinting System", ISMIR 2002, 3rd International Conference on Music Information Retrieval, Paris, France, Oct. 13-17, 2002, Proceedings, http://ismir2002.ismir.net/proceedings/02-FP04-2.pdf, 9 pages.

English Abstract for CN 110070863 retrieved on Espacenet on Nov. 11, 2020.

English Abstract for CN109272991 retrieved on Espacenet on Nov. 11, 2020.

Wikipedia, "Band-stop filter", https://en.wikipedia.org/wiki/Band-stop_filter, accessed Nov. 11, 2020, 4 pages.

* cited by examiner

METHOD AND SYSTEM FOR RECOGNIZING A REPRODUCED UTTERANCE

CROSS-REFERENCE

The present application claims priority to Russian Patent Application No. 2020113388, entitled "METHOD AND SYSTEM FOR RECOGNIZING A REPRODUCED UTTERANCE," filed on Apr. 13, 2020, the entirety of which is incorporated herein by reference.

The present technology relates to natural language processing in general; and specifically, to a method and a system for processing an utterance reproduced by an electronic device.

BACKGROUND

Electronic devices, such as smartphones and tablets, are able to access an increasing and diverse number of applications and services for processing and/or accessing different types of information. However, novice users and/or impaired users and/or users may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Virtual assistant applications have been developed to perform functions in response to such user requests. Such virtual assistant applications may be used, for example, for information retrieval, navigation, but also a wide variety of commands. A conventional virtual assistant application (such as a Siri™ virtual assistant application, an Alexa™ virtual assistant application, and the like) can receive a spoken user utterance in a form of a digital audio signal from an electronic device and perform a large variety of tasks for the user. For example, the user can communicate with the virtual assistant application by providing spoken utterances for asking, for example, what the current weather is like, where the nearest shopping mall is, and the like. The user can also ask for the execution of various applications installed on the electronic device.

Naturally, to activate the virtual assistant application, the user may need to provide (that is, utter) a wake up word or phrase (such as "Hey Siri", "Alexa", "OK Google", and the like). Once the virtual assistant application has received the wake up word, it may be further configured to receive a voice command from the user for implementation.

However, in order to be effectively operated by the user, the virtual assistant application should be preconfigured to filter out false activations, that is the activations produced not by the user him-/herself, but by background noise produced by another electronic device. For example, the virtual assistant application may be activated by TV background sounds when a TV commercial of the virtual assistant application, including the wake up word and a sample command, is on TV and reproduced in a vicinity of the electronic device that runs the virtual assistant application. As a result, the virtual assistant application, having received the wake up word from the TV commercial, may react to the received false activation and implement the sample command, thereby causing unnecessary disturbance to the user.

In other examples, when the virtual assistant application is used while the user is driving a car, such false activations (for example, from a radio commercial received from an onboard radio of the car) may distract user's attention which may result in a car accident.

In order to address the above-identified technical problem, certain prior art approaches have been proposed to make the virtual assistant application ignore the false activations including generating "customized" audio content. In other words, the audio content including the wake up word for the virtual assistant application (commercials of the virtual assistant application and any other broadcast audio message thereof) is superimposed with an additional audio signal (a so-called "watermark") that is not audible to a human ear, however can be recognized by the virtual assistant application, when reproduced by the other electronic device, and as such, cause the virtual assistant application to ignore the audio signal.

U.S. Pat. No. 10,276,175-B1 issued on Apr. 30, 2019, assigned to Google LLC, and entitled "Key Phrase Detection with Audio Watermarking" discloses methods, systems, and apparatus, including computer programs encoded on computer storage media, for using audio watermarks with key phrases. One of the methods includes receiving, by a playback device, an audio data stream; determining, before the audio data stream is output by the playback device, whether a portion of the audio data stream encodes a particular key phrase by analyzing the portion using an automated speech recognizer; in response to determining that the portion of the audio data stream encodes the particular key phrase, modifying the audio data stream to include an audio watermark; and providing the modified audio data stream for output.

United States Patent Application Publication No.: 2018/0350376-A1 published on Dec. 6, 2018, assigned to Dell products LP, and entitled "High Frequency Injection for Improved False Acceptance Reduction" discloses methods and systems for high frequency injection and detection for improved false acceptance reduction. An information handling system may be configured to receive audio data and to add an identification signal to the audio data, wherein the identification signal is determined based on the audio data. The combined audio data and the identification signal may be output to a receiving device. An information handling system may also be configured to receive data that includes audio data and an identification signal that is associated with one or more frequencies in the audio data, identify the one or more frequencies in the audio data that are associated with the identification signal, and attenuate the one or more frequencies in the audio data to obtain modified audio data. The modified audio data may be output for audio processing.

U.S. Pat. No. 9,928,840-B2 issued on Mar. 27, 2018, assigned to Google LLC, and entitled "Hotword Recognition" discloses methods, systems, and apparatus, including computer programs encoded on a computer storage medium, for receiving audio data corresponding to an utterance, determining that the audio data corresponds to a hotword, generating a hotword audio fingerprint of the audio data that is determined to correspond to the hotword, comparing the hotword audio fingerprint to one or more stored audio fingerprints of audio data that was previously determined to correspond to the hotword, detecting whether the hotword audio fingerprint matches a stored audio fingerprint of audio data that was previously determined to correspond to the hotword based on whether the comparison indicates a similarity between the hotword audio fingerprint and one of the one or more stored audio fingerprints that satisfies a predetermined threshold, and in response to detecting that the hotword audio fingerprint matches a stored audio fingerprint, disabling access to a computing device into which the utterance was spoken.

SUMMARY

It is an object of the present technology to ameliorate at least some of the inconveniences present in the prior art.

The developers of the present technology have realized that recognizing, by the virtual assistant application, the customized content including an utterance of the wake up word could be more effective and accurate if the customized content, instead of the watermarks, included "gaps" in the audio signal.

Thus, the audio signal of the audio content to be broadcast is first processed to exclude certain portions thereof at predetermined frequency levels, thereby generating, in the audio signal, a specific audio pattern, which is recognizable by the virtual assistant application. Once the virtual assistant application receives the processed audio signal, it may determine that the processed audio signal has been produced by the other electronic device, and not by the user, by recognizing therein the specific audio pattern. Accordingly, the virtual assistant application may further ignore the wake up word in the processed audio signal by not getting activated thereby.

Non-limiting embodiments of the present technology directed to a method of recognizing a reproduced utterance may allow for better effectiveness and accuracy than the prior art approaches as the former, inter alia, is believed of a higher speed of response and is more resistant to noise.

Therefore, in accordance with one broad aspect of the present technology, there is provided a computer-implemented method for operating a speaker device. The speaker device is associated with a first operating mode and a second operating mode. The speaker device is further associated with a pre-determined wake up word, which is configured, once recognized by the speaker device being in the first operating mode, to cause the speaker device to switch into the second operating mode. The method is executable by the speaker device, the method comprises: capturing, by the speaker device, an audio signal having been generated in a vicinity of the speaker device, the audio signal having been generated by one of a human user and an other electronic device; retrieving, by the speaker device, a processing filter, the processing filter being indicative of a pre-determined signal augmentation pattern representative of an excluded portion that has been excluded from an originating utterance having the wake up word, the originating utterance to be reproduced by the other electronic device; applying, by the speaker device, the processing filter to determine presence of the pre-determined signal augmentation pattern in the audio signal; in response to determining the presence of the pre-determined signal augmentation pattern in the audio signal, determining that the audio signal has been produced by the other electronic device.

In some implementations of the method, the method further comprises, in response to determining the presence of the pre-determined signal augmentation pattern in the audio signal, discarding the audio signal from further processing.

In some implementations of the method, the method further comprises, in response to determining the presence of the pre-determined signal augmentation pattern in the audio signal, executing a pre-determined additional action other than processing the audio signal to determine presence of the pre-determined wake up word therein.

In some implementations of the method, in response to not determining the presence of the pre-determined signal augmentation pattern in the audio signal, the method further comprises: determining that the audio signal has been produced by the human user; applying, by the speaker device, a speech-to-text algorithm to the audio signal to generate a text representation thereof; processing, by the speaker device, the text representation to determine presence of the wake up word therein; in response to determining the presence of the wake up word, switching the speaker device onto the second operating mode.

In some implementations of the method, the signal augmentation pattern is associated with one of pre-determined frequency levels.

In some implementations of the method, the signal augmentation pattern is associated with a plurality of pre-determined frequency levels, the plurality of pre-determined frequency levels being selected from a spectrum recognizable by a human ear.

In some implementations of the method, the plurality of pre-determined frequency levels are such that they are not divisible by each other.

In some implementations of the method, the signal augmentation pattern is associated with a plurality of pre-determined frequency levels, the plurality of pre-determined frequency levels being selected from a spectrum recognizable by a human ear and being not divisible by each other.

In some implementations of the method, the plurality of pre-determined frequency levels are randomly selected.

In some implementations of the method, the plurality of pre-determined frequency levels are randomly pre-selected.

In some implementations of the method, the plurality of pre-determined frequency levels comprises:
486 Hz
638 Hz
814 Hz
1355 Hz
2089 Hz
2635 Hz
3351 Hz
4510 Hz In some implementations of the method, the pre-determined signal augmentation pattern is a first pre-determined signal augmentation pattern and wherein the method further comprises receiving an indication of a second pre-determined signal augmentation pattern, different from the first pre-determined signal augmentation pattern.

In some implementations of the method, the second pre-determined signal augmentation pattern is for indicating a type of the other electronic device.

In some implementations of the method, the first operating mode is associated with local speech to text processing, and the second operating mode is associated with a server-based speech to text processing.

In some implementations of the method, the other electronic device is located in the vicinity of the speaker device.

In some implementations of the method, exclusion of the excluded portion forms a sound gap when the originating utterance is reproduced by the other device, the sound gap being substantially un-recognizable by a human ear.

In some implementations of the method, the applying the processing filter comprises first processing the audio signal into time-frequency representation thereof.

In some implementations of the method, the processing the audio signal comprises applying a Fourier transformation.

In some implementations of the method, the applying the Fourier transformation is executed by a stacked window approach.

In some implementations of the method, the applying, by the speaker device, the processing filter is executed for each of the stacked windows.

In some implementations of the method, the determining the presence of the pre-determined signal augmentation pattern in the audio signal is in response to the presence of the pre-determined signal augmentation pattern in at least one of the stacked windows.

In some implementations of the method, the applying the processing filter to determine the presence of the pre-determined signal augmentation pattern in the audio signal comprises determining energy levels in a plurality of pre-determined frequencies where sound has been filtered out.

In some implementations of the method, the determining energy levels comprises comparing an energy level at a given one of the plurality of pre-determined frequencies where sound has been filtered out to an energy level in an adjacent frequency where the sound has not been filtered out.

In some implementations of the method, the presence of the pre-determined signal augmentation pattern is determined in response to a difference between energy levels being above a pre-determined threshold.

In some implementations of the method, the pre-determined threshold is calculated as frequency multiplied by a pre-determined multiplier.

In accordance with another broad aspect of the present technology, there is provided a computer-implemented method for generating an audio feed for transmitting to an electronic device for audio-processing thereof. The audio feed has a content that includes a pre-determined wake up word. The pre-determined wake up word is configured, once recognized by a speaker device being in a first operating mode, to cause the speaker device to switch into a second operating mode from the first operating mode. The method is executable by a production server. The method comprises: receiving, by the production server, the audio feed having the content, the audio feed having been pre-recorded; retrieving, by the production server, a processing filter, the processing filter being indicative of a pre-determined signal augmentation pattern representative of an excluded portion to be excluded from the audio feed to indicate to the speaker device to ignore the wake up word contained in the content, excluding, by the production server, the excluded portion from the audio feed thereby forming a sound gap when the audio feed is reproduced by the electronic device; causing transmission of the audio feed to the electronic device.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
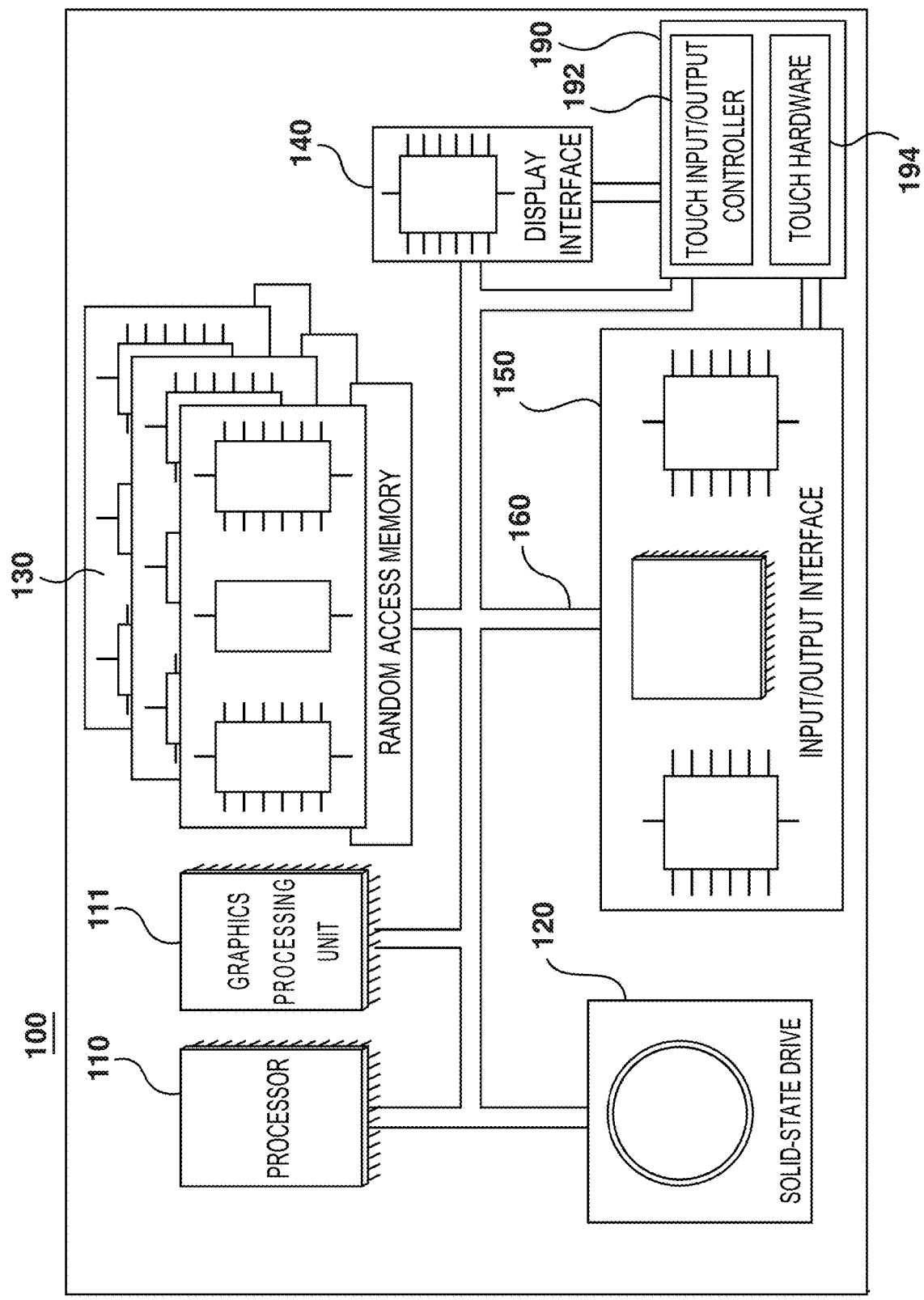
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190. In some embodiments, the computer system 100 may comprise one or more microphones (not shown). The microphones may record audio, such as user utterances. The user utterances may be translated to commands for controlling the computer system 100.

It is noted some components of the computer system 100 can be omitted in some non-limiting embodiments of the present technology. For example, the touchscreen 190 can be omitted, especially (but not limited to) where the computer system is implemented as a smart speaker device.

According to implementations of the present technology, the solid-state drive 120 stores program instructions suitable for being loaded into the random access memory 130 and executed by the processor 110 and/or the GPU 111. For example, the program instructions may be part of a library or an application.

Networked Computing Environment

Figure 2:
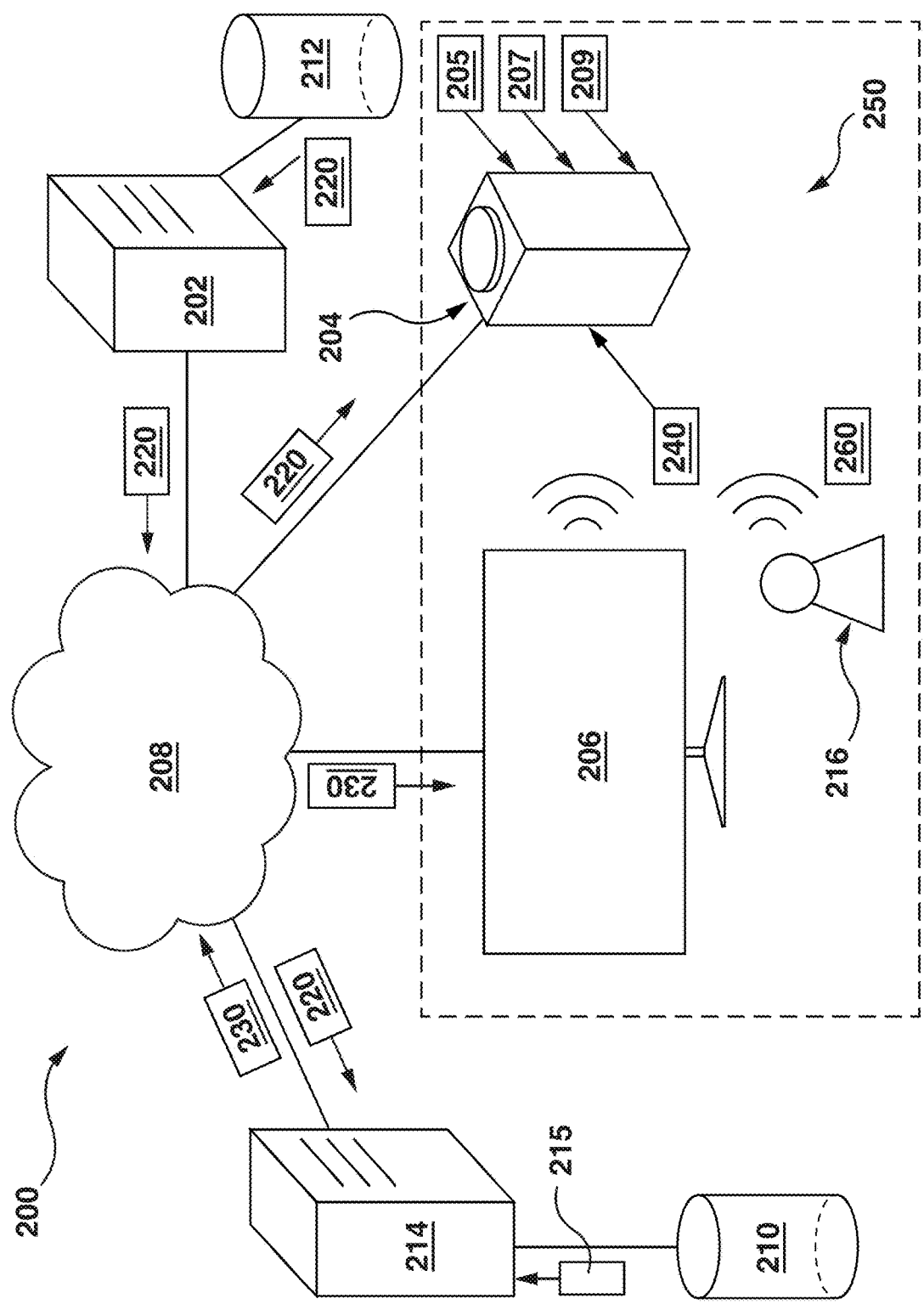
FIG. 2 depicts a networked computing environment suitable for some implementations of the present technology.

With reference to FIG. 2, there is depicted a schematic diagram of a networked computing environment 200 suitable for use with some embodiments of the systems and/or methods of the present technology. The networked computing environment 200 comprises a server 202 communicatively coupled, via a communication network 208, to a first electronic device 204. In the non-limiting embodiments of the present technology, the first electronic device 204 may be associated with a user 216.

In the non-limiting embodiments of the present technology, the first electronic device 204 may be any computer hardware that is capable of running a software appropriate to the relevant task at hand. Thus, some non-limiting examples of the first electronic device 204 may include personal computers (desktops, laptops, netbooks, etc.), smartphones, and tablets.

The first electronic device 204 may comprise some or all components of the computer system 100 depicted in FIG. 1. In certain non-limiting embodiments of the present technology, the first electronic device 204 may be a smart speaker (such as for example, Yandex.Station™ provided by Yandex LLC of 16 Lev Tolstoy Street, Moscow, 119021, Russia) comprising the processor 110, the solid-state drive 120 and the random access memory 130.

In the non-limiting embodiments of the present technology, the first electronic device 204 may comprise hardware and/or software and/or firmware (or a combination thereof) such that the processor 110 may be configured to execute a virtual assistant application 205. Generally speaking, the virtual assistant application 205 is capable of hands-free activation in response to one or more "wake up words" (also known as "trigger words"), and able to perform tasks or services in response to a command received following thereafter. For example, the virtual assistant application 205 may be implemented as an ALISA™ virtual assistant application (provided by Yandex LLC of 16 Lev Tolstoy Street, Moscow, 119021, Russia), or other commercial or proprietary virtual assistant applications having been pre-installed on the first electronic device 204. As such, the first electronic device 204 may receive a command via a microphone 207 implemented within the first electronic device 204.

In the non-limiting embodiments of the present technology, the microphone 207 is configured to capture any sound having been produced in a vicinity 250 of the first electronic device 204, thereby generating an analog audio signal. For example, the microphone 207 of the first electronic device 204 may generate an audio signal 240. In some non-limiting embodiments of the present technology, the microphone 207 can be either a stand-alone device communicatively coupled with the first electronic device 204 or be part of the first electronic device 204.

In the non-limiting embodiments of the present technology, the first electronic device 204 may operate at least in a first operating mode and in a second operating mode.

First Operating Mode

In the non-limiting embodiments of the present technology, in the first operating mode, the processor 110 is configured to receive the audio signal 240 and determine presence therein of a predetermined wake up word, associated with the virtual assistant application 205. For example, the audio signal 240 may be generated in response to a user utterance 260 of the user 216. In other words, in the first operating mode, the processor 110 is configured to wait to receive the predetermined wake up word to activate the virtual assistant application 205 for receiving and implementing further commands.

To that end, the processor 110 may comprise (or otherwise have access to) an analog-to-digital converter (not separately depicted), configured to convert the audio signal 240, generated by the microphone 207, into a digital signal.

Having converted the audio signal into the digital signal, the processor 110 may further apply a speech-to-text algorithm to generate a text representation of the digital signal to determine, therein, presence of the predetermined wake up word.

In the non-limiting embodiments of the present technology, the speech-to-text algorithm may comprise a natural language processing (NLP) algorithm (not separately depicted). How the NLP algorithm is implemented is not limited. For example, the NLP algorithm may be based on Latent Semantic Analysis (LSA), Probabilistic Latent Semantic Analysis (pLSA), Word2vec, Global Vectors for Word Representation (GloVe), or Latent Dirichlet Allocation (LDA).

In response to determining, in the text representation of the digital signal, the presence of the predetermined wake up word, the processor 110 may cause the first electronic device 204 to switch into the second operating mode. Conversely, having processed the text representation of the digital signal and not determined the presence therein of the predetermined wake up word, the processor 110 causes the first electronic device 204 to remain in the first operating mode.

Second Operating Mode

In accordance with the non-limiting embodiments of the present technology, once the processor 110 has determined the presence of the predetermined wake up word in the audio signal 240, the processor 110 may cause the first electronic device 204 to switch into the second operating mode. In some embodiments of the present technology, the virtual assistant application 205 is operated in the second operating mode.

To that end, the processor 110 may be configured to cause the virtual assistant application 205 to receive a voice command, having been produced in the vicinity 250 of the first electronic device 204, following receiving the predetermined wake up word, for execution.

In accordance with the non-limiting embodiments of the present technology, the execution of the received voice command may be associated with the processor 110 executing at least one of a plurality of service applications 209 run by (or otherwise accessible by) the first electronic device 204 or by the server 202.

Generally speaking, the plurality of service applications 209 corresponds to electronic applications accessible by the processor 110 of the first electronic device 204. In some non-limiting embodiments of the present technology, the plurality of service applications 209 comprises at least one service application (not separately depicted) that is operated by the same entity that has provided the afore-mentioned virtual assistant application 205. For example, if the virtual assistant application 205 is the ALISA™ virtual assistant application, the plurality of service applications 209 may include a Yandex.Browser™ web browser application, a Yandex.News™ news application, a Yandex.Market market application, and the like. Needless to say, the plurality of service applications 209 may also include service applications that are not operated by the same entity that has provided the afore-mentioned virtual assistant application 205, and may comprise for example, social media applications such as Vkontakte™ social media application, and music streaming application such as Spotify™ music streaming application. In some non-limiting embodiments of the present technology, the plurality of service applications 209 may include a side electronic service, such as an application for dialogues (such as Yandex.Dialogs™), an application for ordering a taxi, an application for ordering food, and the like. In some non-limiting embodiments of the present technology, the plurality of service applications 209 may be associated with one or more electronic devices linked to the first electronic device 204 (not depicted).

In the non-limiting embodiments of the present technology, to determine an association between the received voice command and a respective one of the plurality of service applications 209, the processor 110 may be configured to cause the virtual assistant application 205 to transmit data indicative of the received voice command to the server 202 for further processing by an automatic speech recognition (ASR) application (not separately depicted) run thereat. In accordance with some non-limiting embodiments of the present technology, the ASR application may be implemented as described in a co-owned patent application entitled "METHOD AND SYSTEM FOR PROCESSING USER SPOKEN UTTERANCE" bearing Ser. No. 17/114, 059; the content of which is hereby incorporated by reference in its entirety.

Thus, in the non-limiting embodiments of the present technology, the server 202 may be configured to receive, from the first electronic device 204, the voice command for executing one of the plurality of service applications 209.

In some non-limiting embodiments of the present technology, the server 202 is implemented as a conventional computer server and may comprise some or all of the components of the computer system 100 of FIG. 1. In one non-limiting example, the server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 202 is a single server. In alternative non-limiting embodiments of the present technology (not depicted), the functionality of the server 202 may be distributed and may be implemented via multiple servers.

In some non-limiting embodiments of the present technology, the server 202 can be operated by the same entity that has provided the afore-described virtual assistant application 205. For example, if the virtual assistant application 205 is the ALISA™ virtual assistant application, the server 202 can also be operated by Yandex LLC of Lev 16 Tolstoy Street, Moscow, 119021, Russia. In alternative embodiments, the server 202 can be operated by an entity different from the one that has provided the aforementioned virtual assistant application 205.

In some non-limiting embodiments of the present technology, the networked computing environment 200 may further comprise a second electronic device 206 also communicatively coupled to the communication network 208.

Broadly speaking, in the non-limiting embodiments of the present technology, the second electronic device 206 may be configured to (i) receive, via the communication network 208, audio or audio-visual content and (ii) reproduce the audio or audio-visual content in the vicinity 250 of the first electronic device 204. To that end, the second electronic device 206 may further comprise one or more loudspeakers (not separately depicted).

Although in the depicted embodiments of FIG. 2 the second electronic device 206 is a TV set, it should be expressly understood that in other non-limiting embodiments of the present technology, the second electronic device 206 may comprise any other type of an electronic device as contemplated by the context of the present specification as set forth above with respect to the first electronic device 204. In yet other non-limiting embodiments of the present technology, the second electronic device 206 may comprise a plurality of electronic devices.

Also coupled to the communication network 208, is a production server 214. Broadly speaking, the production server 214 may be implemented similarly to the server 202 and configured to (i) process audio feeds received from third-party media servers (not separately depicted), thereby generating audio files; and (ii) supply the so-generated audio files, via the communication network 208, to electronic devices (such as the second electronic device 206) for reproduction thereof.

For example, the production server 214 may transmit, and the second electronic device 206 may be configured to receive and reproduce, in the vicinity 250 of the first electronic device 204, an audio file 230.

Further, it should be noted that the second electronic device 206 may be communicatively coupled, aside from the production server 214, to other third-party media servers (not separately depicted) for reproducing audio content received therefrom via the communication network 208.

Thus, it is contemplated that the audio file 230 reproducible by the second electronic device 206 may include the predetermined wake up word associated with the virtual assistant application 205. In this case, the virtual assistant application 205 may be falsely activated, thereby causing the first electronic device 204 to switch from the first operating mode into the second operating mode in response to the audio file 230 reproduced by the second electronic device 206.

Broadly speaking, the non-limiting embodiments of the present technology are directed to determining, by the processor 110 of the first electronic device 204, if the audio signal 240 has been generated, by the microphone 207, in response to the user utterance 260 or a play back of the audio file 230 reproduced by the second electronic device 206. Accordingly, once the processor 110 has determined that the audio signal 240 was generated not in response to the user utterance 260, the processor 110 can discard the audio signal 240 from further processing. Alternatively, if the processor 110 determines that the audio signal 240 has been generated in response to the user utterance 260, it proceeds with determining the presence therein of the predetermined wake up word. In other words, the non-limiting embodiments of the present technology are directed to "filtering out", by the processor 110, audio signals not generated in response to the user utterance 260, but in response to reproduction of the audio file 230 received over the communication network 208.

In the non-limiting embodiments of the present technology, the determining, by the processor 110, how the audio signal 240 has been generated comprises determining presence therein of a predetermined signal augmentation pattern.

How the predetermined signal augmentation pattern is generated will be described below with reference to FIGS. 3 to 6.

Communication Network

In some non-limiting embodiments of the present technology, the communication network 208 is the Internet. In alternative non-limiting embodiments of the present technology, the communication network 208 can be implemented as any suitable local area network (LAN), wide area network (WAN), a private communication network or the like. It should be expressly understood that implementations for the communication network are for illustration purposes only. How a respective communication link (not separately numbered) between each one of the server 202, the production server 214, the first electronic device 204, and the second electronic device 206 and the communication network 208 is implemented will depend, inter alia, on how each one of the server 202, the production server 214, the first electronic device 204, and the second electronic device 206 is implemented. Merely as an example and not as a limitation, in those embodiments of the present technology where the first electronic device 204 is implemented as a wireless communication device such as a smart speaker, the communication link can be implemented as a wireless communication link. Examples of wireless communication links include, but are not limited to, a 3G communication network link, a 4G communication network link, and the like. The communication network 208 may also use a wireless connection with the server 202 and the production server 214.

Generating Audio Content

As previously mentioned, in some non-limiting embodiments of the present technology, the production server 214 may be configured to process pre-recorded audio feeds, thereby generating audio files (for example, the audio file 230) for further transmitting, in response to requests from the second electronic device 206, via the communication network 208, for reproduction. The production server 214 may be configured to receive the audio feeds, via the communication network 208, for example, from the other third-party media servers (not separately depicted) without departing from the scope of the present technology.

In the context of the present specification, the terms "audio feed" and "audio file" broadly refer to any digital audio file and/or analog audio tracks (including those being part of video) of any format and nature and including, without being limited, advertisements, news feeds, audio tracks of blog videos and TV shows, and the like. As such, audio feeds, as referred to herein, represent electronic media entities that are representative of electrical signals having frequencies corresponding to human hearing and suitable for being transmitted, received, stored, and reproduced using suitable soft- and hardware.

Naturally, the production server 214 may be coupled to (or otherwise have access to) a production server analog-to-digital converter (not separately depicted) to be able to receive audio feeds in analog audio formats and convert them into digital audio files.

According to the non-limiting embodiments of the present technology, the production server 214 may be communicatively coupled to (or otherwise have access to) a content database 210 to store therein the audio feeds.

In the non-limiting embodiments of the present technology, at least one of the audio feeds stored in the content database 210 (for example, an audio feed 215) may have been pre-recorded including an utterance of the predetermined wake up word associated with the virtual assistant application 205.

In the non-limiting embodiments of the present technology, the production server 214 is configured, before transmitting via the communication network 208, to process the audio feed 215 to generate therein a respective predetermined signal augmentation pattern, thereby generating, therefrom, the audio file 230. In some non-limiting embodiments of the present technology, the production server 214 may be configured to process the audio feed 215 in response to a request therefor from the second electronic device 206. In alternative embodiments of the present technology, the production server 214 may be configured to process the audio feed 215 without receiving any request for transmission of it, and for example, once the audio feed 215 has been received, by the production server 214, from the other third-party media servers (not separately depicted).

Broadly speaking, a given predetermined signal augmentation pattern, when generated and included in the audio feed 215, may indicate to the first electronic device 204 to ignore audio signals generated in response to reproduction of the audio file 230 in the vicinity 250. To put it another way, if the processor 110 determines that an audio signal (for example, the audio signal 240) has been generated, by the microphone 207, in response to reproduction of the audio file 230, for example, by the second electronic device 206, the processor 110 would reject the audio signal 240 from further processing to determine the presence therein of the predetermined wake up word.

In this regard, according to the non-limiting embodiments of the present technology, the processor 110 of the first electronic device 204, upon receiving the audio signal 240, may be configured to determine presence therein of the predetermined signal augmentation pattern, before determining the presence of the predetermined wake up word. How the processor 110 is configured to determine the presence of the predetermined signal augmentation pattern will be described below with reference to FIG. 6.

In accordance with the non-limiting embodiments of the present technology, the predetermined signal augmentation pattern may be generated, by the production server 214, by processing the audio feed 215 using one or more signal processing filters received, via the communication network 208, from the server 202.

In the context of the present specification, the term "signal processing filter" broadly refers to a program code run by the production server 214 using suitable software that removes some pre-determined components or features from a signal. Specifically, such program codes may be configured to remove some frequencies or frequency bands from the signal.

In some non-limiting embodiments of the present technology, the one or more signal processing filters may comprise respective pieces of program code stored in a filter database 212 run by the server 202.

For example, the production server 214 may request the server 202 to provide one or more signal processing filters (for example, a signal processing filter 220) from the filter database 212 for processing the audio feed 215 to generate and include therein the predetermined signal augmentation pattern, thereby generating the audio file 230. In this regard, the production server 214 may first be configured to generate a time-frequency representation of the audio feed 215.

Figure 3:
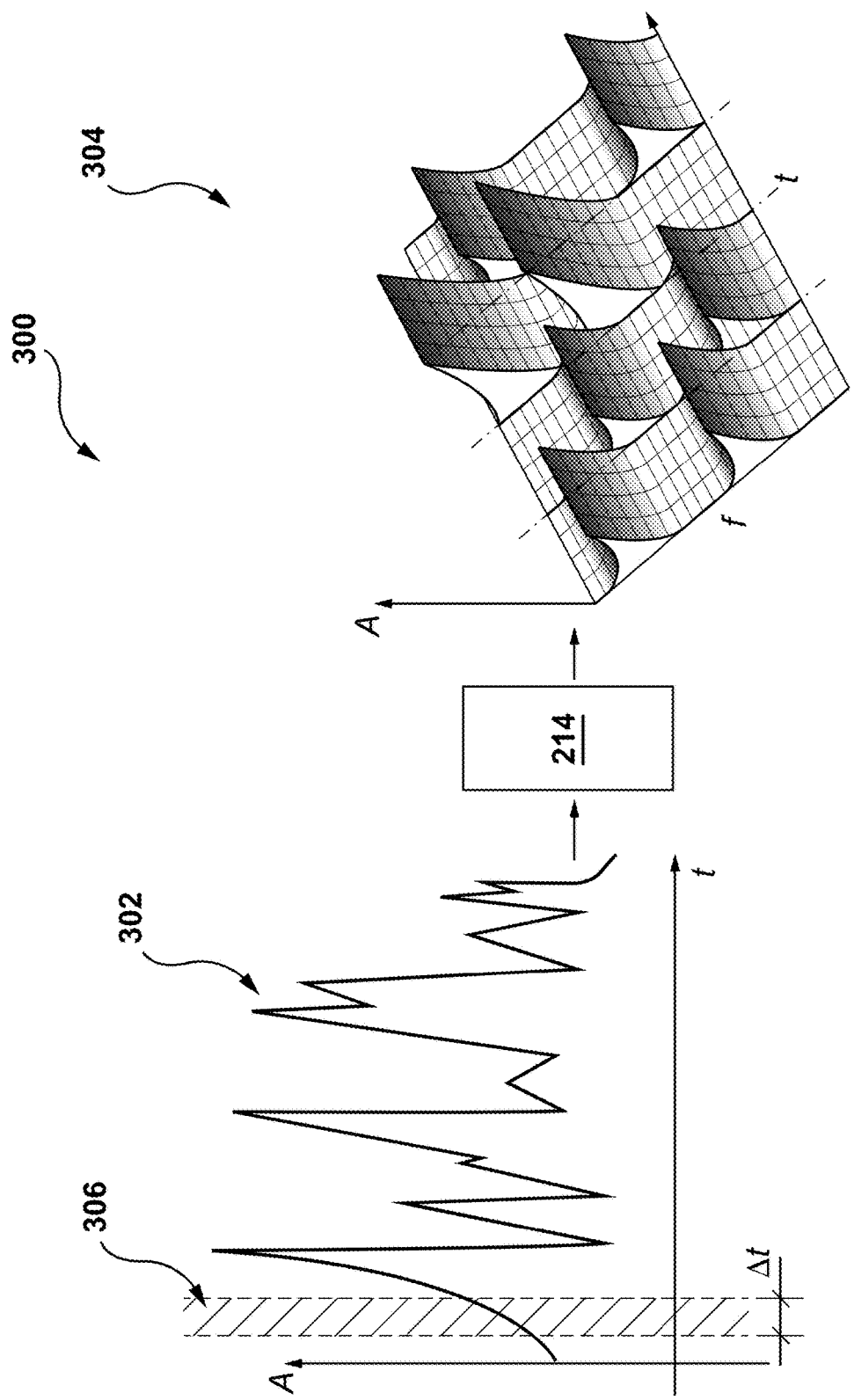
FIG. 3 depicts a schematic diagram of a process for generating, by a production server present in the networked computing environment of FIG. 2, a time-frequency representation of an audio feed, in accordance with the non-limiting embodiments of the present technology.

With reference to FIG. 3, there is depicted a schematic diagram of a process 300 for generating an initial time-frequency representation 304 of the audio feed 215, in accordance with the non-limiting embodiments of the present technology.

First, the production server 214 may be configured to generate an initial amplitude-time representation 302 of the audio feed 215 having sampled the original signal of the audio feed 215 using one of signal sampling techniques. For example, however without being limited to, the production server 214 may be configured to use a sampling technique based on the Nyquist rate.

Second, according to the non-limiting embodiments of the present technology, the production server 214 may be configured to apply a Short-Time Fourier transform (STFT) to the initial amplitude-time representation 302, thereby generating the initial time-frequency representation 304 of the audio feed 215.

Generally speaking, the STFT allows for demonstrating how frequency components of the given signal vary over time. As such, the STFT comprises a sequence of Fourier transforms on each of shorter time segments, so-called "time windows" stacked along the time axis, of the given signal.

Thus, the production server 214 may be configured to apply the STFT with a time window 306 to the initial amplitude-time representation 302 of the audio feed 215, thereby generating the initial time-frequency representation 304 thereof. Therefore, it can be said that by applying the STFT to the initial amplitude-time representation 302, the production server 214 is configured to consecutively apply the Fourier transform to each portion of the initial amplitude-time representation 302 corresponding to a size of the time window 306 that is "sliding along" the time axis.

In some non-limiting embodiments of the present technology, the size of the time window 306 for the audio feed 215 can be selected based on a trade-off between the time resolution and the frequency resolution of the initial time-frequency representation 304: the "narrower" the time window 306 is, the better the time resolution is and the worse the frequency resolution is of the initial time-frequency representation 304 of the audio feed 215, and vice versa.

In other non-limiting embodiments of the present technology, the size of the time window 306 can be selected based on an average time needed for uttering the predetermined wake up word associated with the virtual assistant application 205.

In this regard, the developers of the present technology, based on conducted research, have determined that the size of the time window 306 of 0.5 seconds may be optimal for implementing specific non-limiting embodiments of the present technology. However, in alternative non-limiting embodiments of the present technology, the time window 306 can be between 0.2 seconds and 0.8 seconds, as an example.

For illustrative purposes, the initial time-frequency representation 304 of the audio feed 215 may be representative of a 3D time-frequency spectrum thereof that includes data indicative of frequency values of the audio feed 215 over time along the two respective horizontal axes, and amplitude values of the audio feed 215 on the vertical axis. Alternatively, the initial time-frequency representation 304 of the audio feed 215 may be representative of a 2D time-frequency spectrum thereof including only the Frequency-Time plane of the 3D time-frequency spectrum (for example, that depicted in FIG. 4).

Figure 4:
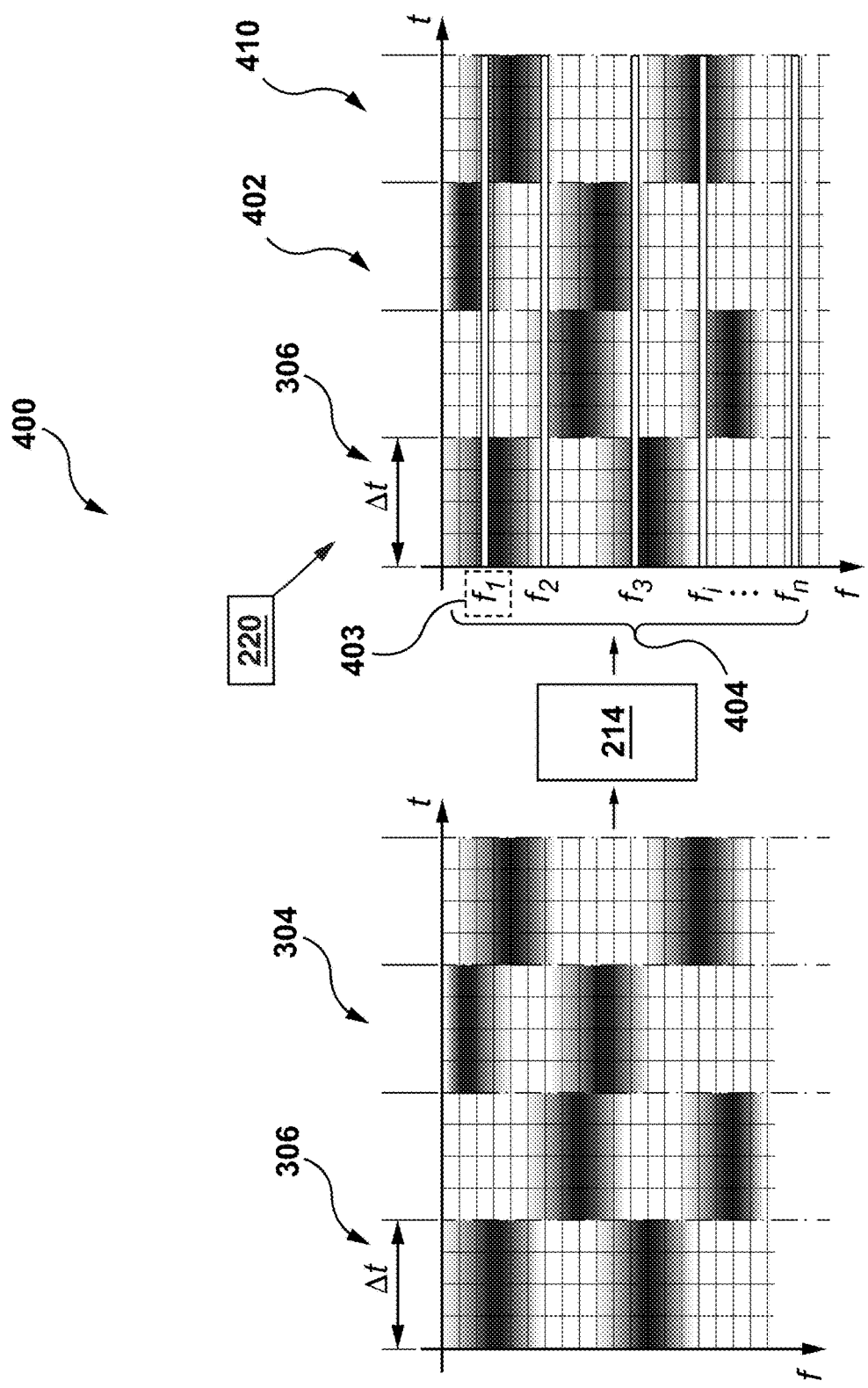
FIG. 4 depicts a schematic diagram of a process for applying, by the production server present in the networked computing environment, a signal processing filter, indicative of a predetermined signal augmentation pattern, to the time-frequency representation generated by the process of FIG. 3, thereby generating a refined time-frequency representation of the audio feed, in accordance with the non-limiting embodiments of the present technology.

With reference to FIG. 4, there is depicted a process 400 of applying, by the production server 214, the signal processing filter 220 to the initial time-frequency representation 304 of the audio feed 215, thereby generating a refined time-frequency representation 402 thereof including a predetermined signal augmentation pattern 410, in accordance with the non-limiting embodiments of the present technology.

In the non-limiting embodiments of the present technology, the signal processing filter 220 may be a notch filter. Broadly speaking, a given notch filter is a signal processing filter configured to remove (or otherwise exclude) at least one specific predetermined frequency level from the time-frequency spectrum of the audio feed 215 represented by the initial time-frequency representation 304 thereof. For example, the given notch filter may be configured to exclude a frequency level $f_1$ 403 from at least one time window 306 within the initial time-frequency representation 304 of the audio feed 215; and thus, the frequency level $f_1$ 403 is excluded in the refined time-frequency representation 402 of the audio feed 215 at least within one time window 306.

Accordingly, the excluded at least one frequency level, within the at least one time window 306, in the refined time-frequency representation 402 of the audio feed 215 forms the predetermined signal augmentation pattern 410. Generally speaking, it can be said that the predetermined signal augmentation pattern 410 is "cut out" in the refined time-frequency representation 402 such that it can further be recognized. Thus, the predetermined signal augmentation pattern 410 is indicative of respective sound gaps when an audio signal generated based on the refined time-frequency representation 402 is being reproduced.

In some non-limiting embodiments of the present technology, the signal processing filter 220 may be a plurality of notch filters indicative of a plurality of predetermined frequency levels 404 $\{f_1, f_2, f_3, \ldots, f_i, \ldots f_n\}$ to be excluded within the at least one time window 306 in the initial time-frequency representation 304 of the audio feed 215. In these embodiments, the plurality of predetermined frequency levels 404 is pre-determined by the server 202 before transmitting the signal processing filter 220 to the production server 214.

In the non-limiting embodiments, the server 202 may be configured to select each one of the plurality of predetermined frequency levels 404 from the range of human hearing frequency levels.

In some non-limiting embodiments of the present technology, the server 202 may be configured to select each of the plurality of predetermined frequency levels 404 to be not divisible by each other (that is, such that no one of the plurality of the predetermined frequency levels 404 is a multiple of any other one of them). Further, in some non-limiting embodiments of the present technology, the server 202 may be configured to select each one of the plurality of predetermined frequency levels 404 randomly from a predetermined distribution of frequency levels from the range of human hearing frequency levels. In these embodiments, the predetermined distribution of frequency levels from the range of human hearing frequency levels may be a uniform probability distribution thereof.

In some non-limiting embodiments of the present technology, the server 202 may be configured to determine a number (and values) of predetermined frequency levels for inclusion into the plurality of predetermined frequency levels 404 based on a trade-off between quality of a resulting audio file (for example, the audio file 230) generated, by the production server 214, based on the refined time-frequency representation 402 of the audio feed 215 and accuracy of detection thereof, for example, by the first electronic device 204. How the audio file 230 may be generated will be described below with reference to FIG. 5.

Therefore, one of non-limiting examples of the above approach to selecting frequency levels for inclusion into the plurality of predetermined frequency levels 404 can include those frequency levels from the range of human hearing frequency levels such that their exclusion would be sufficiently unrecognizable by a human ear, when the audio file 230 is reproduced.

Thus, in specific non-limiting embodiments of the present technology, the plurality of predetermined frequency levels 404 may include 8 (eight) predetermined frequency levels. In these embodiments, the plurality of predetermined frequency levels 404 may include:

486 Hz;
638 Hz;
814 Hz;
1355 Hz;
2089 Hz;
2635 Hz;
3351 Hz;
4510 Hz.

In certain non-limiting embodiments of the present technology, the production server 214 may be configured to generate a plurality of predetermined signal augmentation patterns similarly to the generating the predetermined signal augmentation pattern 410. In this regard, each of the plurality of predetermined signal augmentation patterns can encode certain specific indications for the first electronic device 204.

As mentioned above, the predetermined signal augmentation pattern 410 may be for indicating to the first electronic device 204 that the audio file 230 generated based on the refined time-frequency representation 402 of the audio feed 215, for example, contains an utterance of the predetermined wake up word associated with the first electronic device 204. Accordingly, when the audio file 230 is reproduced in the vicinity 250, the first electronic device 204 may be configured to ignore the reproduced predetermined wake up word.

Another predetermined signal augmentation pattern (not separately depicted), for example, may be used for encoding and further indicating, to the first electronic device 204, a type of electronic device reproducing the audio file 230. For example, the production server 214, before processing the audio feed 215, may receive data indicative of that the audio file 230 is to be reproduced by TV sets. To that end, the production server 214 may be configured to encode this data by the other predetermined signal augmentation pattern (not separately depicted) so the processor 110 of the first electronic device 204, when the audio file 230 is reproduced by the second electronic device 206, would be able to determine that it is being reproduced by the second electronic device 206.

Referring back to FIG. 2 and with continued reference to FIG. 4, having generated the refined time-frequency representation 402 of the audio feed 215, the production server 214 may be configured to generate the audio file 230 therefrom.

Figure 5:
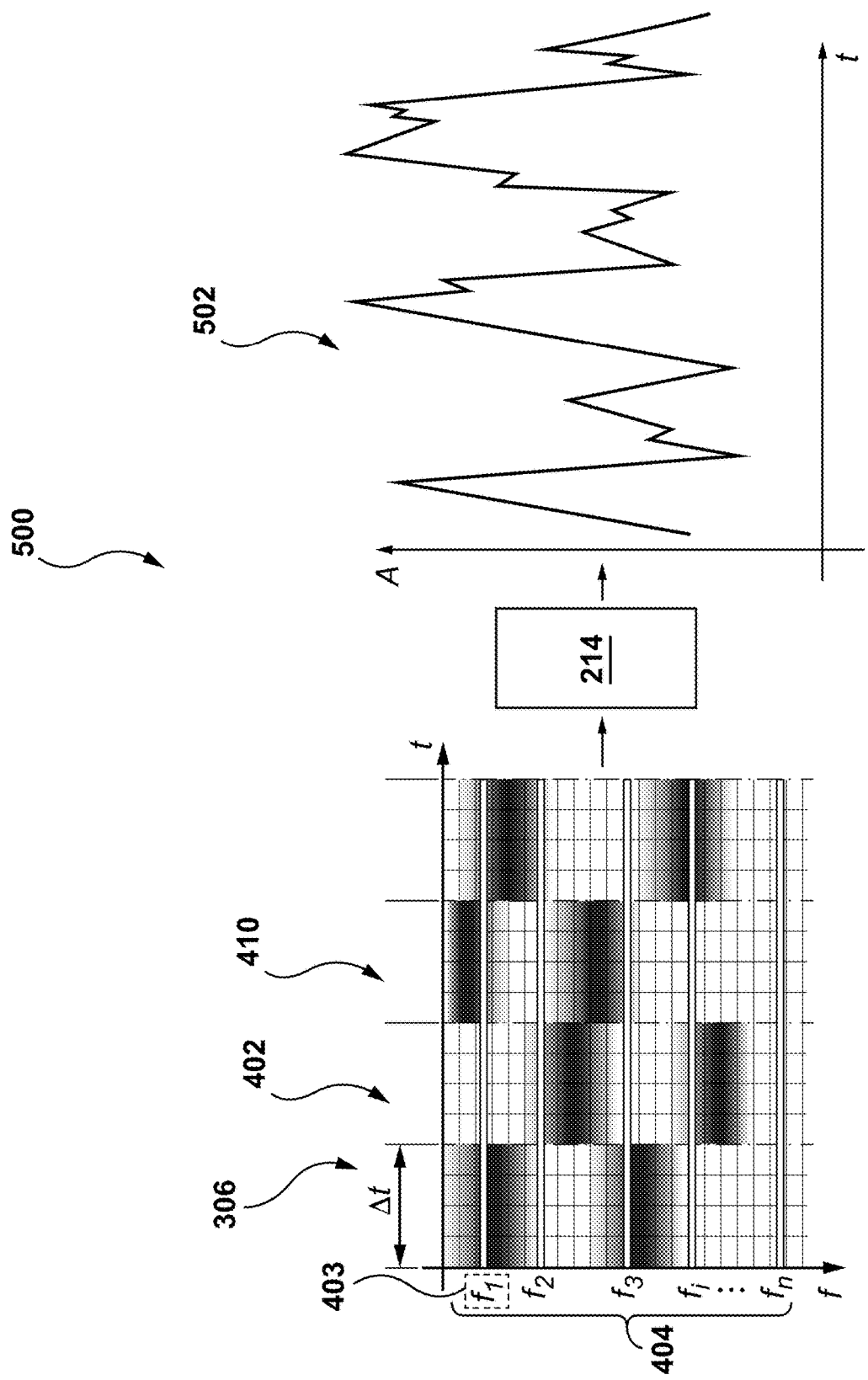
FIG. 5 depicts a schematic diagram of a process for generating, by the production server present in the networked computing environment, an audio document based on the refined time-frequency representation generated by the process of FIG. 4, in accordance with the non-limiting embodiments of the present technology.

With reference to FIG. 5, there is depicted a schematic diagram of a process 500 for restoring a refined amplitude-time representation 502 for the audio file 230 based on the refined time-frequency representation 402, in accordance with the non-limiting embodiments of the present technology.

In order to implement the process 500, according to the non-limiting embodiments of the present technology, the production server 214 may be configured to apply an Inverse Fourier Transform. For example, the production server 214 may be configured to apply an inverse STFT with the same time window 306, thereby generating the refined amplitude-time representation 502 of the audio file 230.

As alluded to above, according to the non-limiting embodiments of the present technology, compared to the audio feed 215, the audio file 230, when reproduced, includes sound gaps corresponding to each of the plurality of predetermined frequency levels 404. In other words, the difference between the audio feed 215 and the audio file 230 is that, in the latter, the frequency levels corresponding to the plurality of predetermined frequency levels 404 have been attenuated by applying the signal processing filter 220.

Detecting Predetermined Signal Augmentation Pattern in Audio Signal

As previously described, the processor 110 (for example, the processor 110 of the first electronic device 204) may be configured to detect the predetermined signal augmentation pattern (such as the predetermined signal augmentation pattern 410) in a received signal (for example, the audio signal 240). However, the description presented below can also be applied mutatis mutandis to those embodiments of the present technology where the detecting the predetermined signal augmentation pattern 410 is executed by the server 202.

To that end, according to the non-limiting embodiments of the present technology, the processor 110 may be configured to (i) receive the audio signal 240 generated, by the microphone 207, in response to a sound captured in the vicinity 250; (ii) determine if the audio signal 240 includes the predetermined signal augmentation pattern 410; and (iii) in response to a positive determination, discard the audio signal from further processing, that is determining the presence therein of the predetermined wake up word.

As mentioned above, in some non-limiting embodiments of the present technology, the audio signal 240 may be generated, by the microphone 207, in response to either (a) the second electronic device reproducing audio content (for example, the audio file 230) or (b) the user utterance 260. Thus, the processor 110 is configured to determine the presence of the predetermined signal augmentation pattern 410 in the audio signal 240 to establish its origin.

First, in the non-limiting embodiments of the present technology, in order to determine the presence of the predetermined signal augmentation pattern 410 in the audio signal 240, the processor 110 is configured to generate a time-frequency representation thereof.

Figure 6:
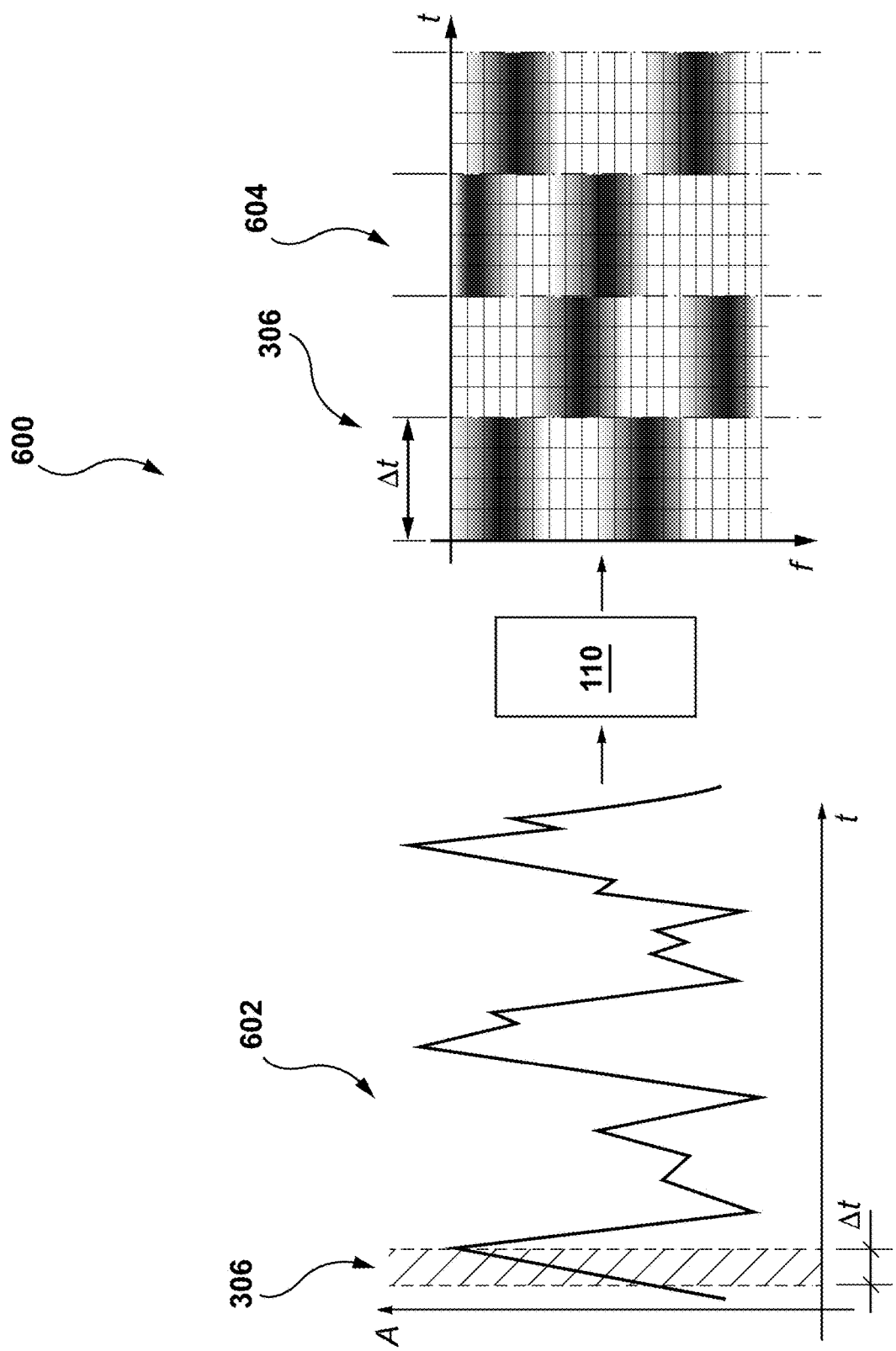
FIG. 6 depicts a schematic diagram of a process for generating, by a processor of the computer system of FIG. 1, a time-frequency representation of a received audio signal, in accordance with the non-limiting embodiments of the present technology.

With reference to FIG. 6, there is depicted a process 600 for generating, by the processor 110, a reproduction time-frequency representation 604 of the audio signal 240, in accordance with the non-limiting embodiments of the present technology.

In the non-limiting embodiments of the present technology, the process 600 is substantially similar to the process 300 for generating, by the production server 214, the initial time-frequency representation 304 of the audio feed 215 described above with reference to FIG. 3.

Accordingly, akin to the production server 214, the processor 110 may be configured to generate a reproduction amplitude-time representation 602 of the audio signal 240. Further, the processor 110 may be configured to apply the STFT with the time window 306 to the reproduction amplitude-time representation 602, thereby generating the reproduction time-frequency representation 604 of the audio signal 240.

In accordance with the non-limiting embodiments of the present technology, the processor 110 may be configured to determine the presence of the predetermined signal augmentation pattern 410 in the audio signal 240 based on the reproduction time-frequency representation 604 thereof by determining energy levels at frequency levels corresponding to the plurality of predetermined frequency levels 404 used for generating the predetermined signal augmentation pattern 410.

To that end, further, the processor 110 may be configured to receive, form the server 202, an indication of the signal processing filter 220 including an indication of the plurality of predetermined frequency levels 404.

Figure 7:
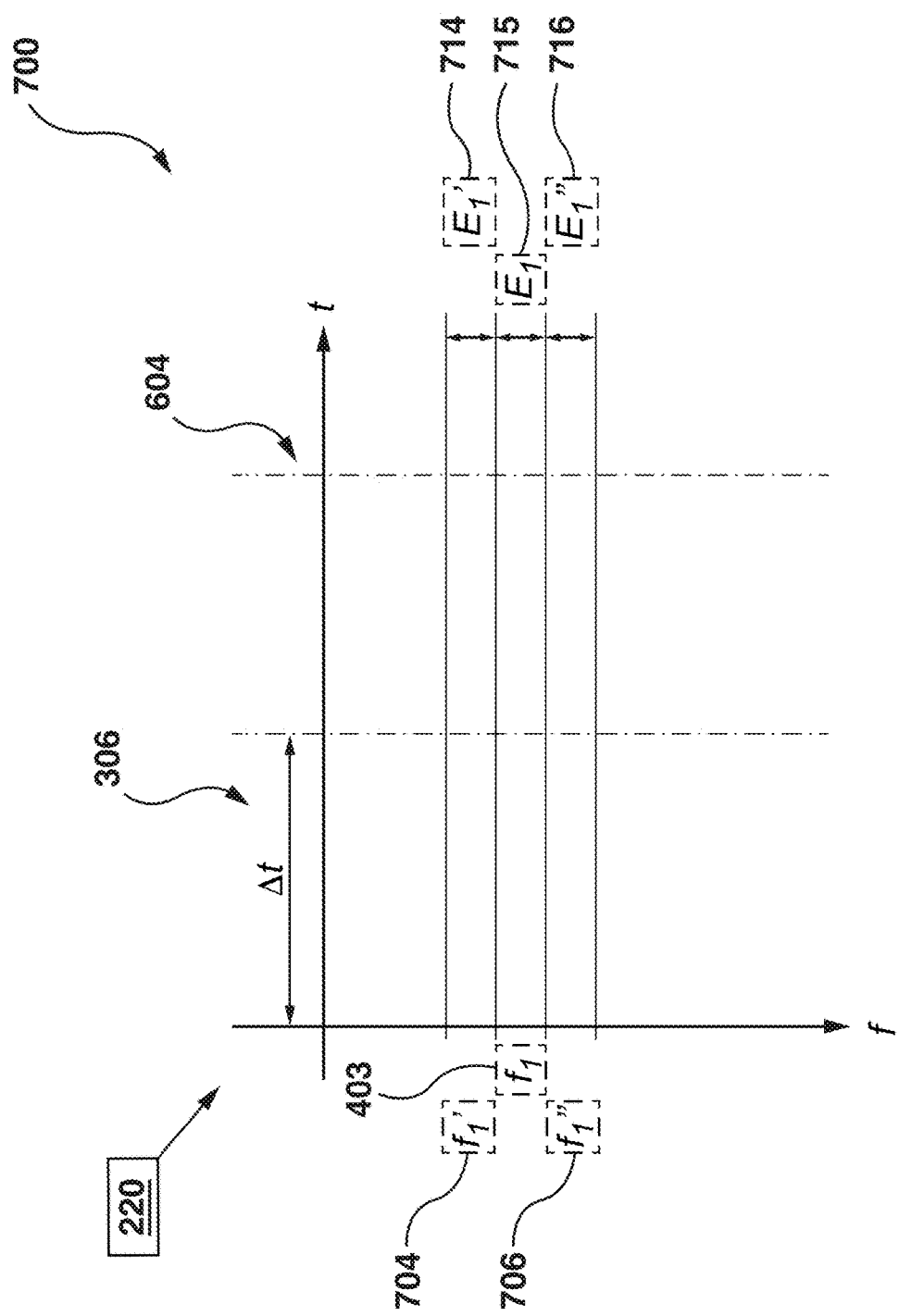
FIG. 7 depicts a schematic diagram of a process for determining, by the processor of the computer system of FIG. 1, the predetermined signal augmentation pattern in the received audio signal, in accordance with the non-limiting embodiments of the present technology.

With reference now to FIG. 7, there is depicted a schematic diagram of a process 700 for determining, by the processor 110, energy levels at frequency levels corresponding to the plurality of the predetermined frequency levels 404, in accordance with then non-limiting embodiments of the present technology.

Specifically, for example, for a given one of the plurality of predetermined frequency levels 404 (for example, the frequency level 403), first, the processor 110 may be configured to determine two respective adjacent frequency levels: a lower adjacent frequency level 704, and an upper adjacent frequency level 706.

How the lower adjacent frequency level 704 and the upper adjacent frequency level 706 are determined is not particularly limited and may include, for example, without being limited to, determining the adjacent frequency levels based on a predetermined constant (for example, 1 Hz), a predetermined multiplier value (for example, 0.3), or selecting immediately following, to and after the frequency level 403, frequency levels based on a sampling frequency value of the analog-to-digital associated with the first electronic device 204.

Further, the processor 110 proceeds to determine: (1) a first energy level 714 of the audio signal 240 at the lower adjacent frequency level 704; (2) a base energy level 715 of the audio signal 240 at the frequency level 403; and (3) a second energy level 716 of the audio signal 240 at the upper adjacent frequency level 706.

In certain non-limiting embodiments of the present technology, instead of determining absolute values of the first energy level 714, the base energy level 715, the second energy level 716, the processor 110 may be configured to calculate logarithmic values thereof.

According to specific non-limiting embodiments of the present technology, the reproduction time-frequency representation 604 of the audio signal 240 may be represented by a plurality of complex numbers, where each complex number corresponds to a respective frequency level of a frequency spectrum of the reproduction time-frequency representation 604 at a respective moment in time. In these embodiments, a given energy level may be determined, for the respective frequency level, at the respective moment in time, as a squared absolute value of the corresponding complex number.

In accordance with the non-limiting embodiments of the present technology, having determined the first energy level 714, the base energy level 715, and the second energy level 716, the processor 110 may be configured to determine a difference therebetween. Specifically, the processor 110 may be configured to determine a first difference value between the first energy level 714 and the base energy level 715, and a second difference value between the second energy level 716 and the base energy level 715.

For the remaining ones of the plurality of predetermined frequency levels 404, the processor 110 may be configured to apply the same procedure of determining the energy levels as described above with respect to the frequency level 403.

Further, according to the non-limiting embodiments of the present technology, the processor 110 may be configured to calculate a first detection value as a sum over respective first difference values and a second detection value as a sum over respective second difference values determined at each one of the plurality of predetermined frequency levels 404.

Finally, having determined the first detection value and the second detection value, the processor 110 may be configured to compare at least one of the first detection value and the second detection value with a predetermined threshold value to determine the presence of the predetermined signal augmentation pattern in the audio signal 240. In certain non-limiting embodiments of the present technology, the processor 110 may be configured to select a maximal one of the first detection value and the second detection value for comparing with the predetermined threshold value.

In alternative non-limiting embodiments of the present technology, the processor 110 may be configured to determine the first detection value and the second detection value differently. For example, the processor 110 may be, first, configured to determine: (1) a base frequency sum over the energy levels determined at each one of the plurality of predetermined frequency levels 404; (2) a lower adjacent frequency sum over energy levels determined at respective lower adjacent frequency levels to each one of the plurality of predetermined frequency levels 404; and (3) an upper adjacent frequency sum over energy levels determined at respective upper adjacent frequency levels to each one of the plurality of predetermined frequency levels 404. In these embodiments, the processor 110 may further be configured to generate logarithmic values of the base frequency sum, the lower adjacent frequency sum, and the upper adjacent frequency sum. Second, the processor 110 may be configured to determine the first detection values a difference between the base frequency sum and the lower adjacent frequency sum; and the second detection value as a difference between the base frequency sum and the upper adjacent frequency sum. The processor 110 may further be configured to select a maximal one of the first detection value and the second detection value for comparing with the predetermined threshold value.

In some non-limiting embodiments of the present technology, the predetermined threshold value may be selected empirically, as a constant signal energy value.

In some non-limiting embodiments of the present technology, the processor 110 may be configured to determine the first detection value and the second detection value within at least one time window 306. Thus, these non-limiting embodiments of the present technology are based on developers' appreciation that the determining the first detection value and the second detection value within at least one time window 306 may allow for a higher response rate to determining the presence of the predetermined signal augmentation pattern 410 in the audio signal 240 compared to the determining the first detection value and the second detection value within the entire timespan of the audio signal 240.

In alternative non-limiting embodiments of the present technology, the processor 110 may be configured to determine the first detection value and the second detection value within each time window 306 stacked along the time axis of the reproduction time-frequency representation 604 of the audio signal 240.

Thus, for example, if the processor 110 has determined, within at least one time window 306 of the reproduction time-frequency representation 604 of the audio signal 240, that the maximal one of the first detection value and the second detection value is greater than the predetermined threshold value, the processor 110 determines that the audio signal 240 includes the predetermined signal augmentation pattern 410. To that end, the processor 110 is configured to determine that the audio signal 240 has been generated, by the microphone 207, in response to the reproduction, by the second electronic device 206, of the audio file 230. Consequently, the processor 110 is configured to discard the audio signal 240 from further processing.

In specific non-limiting embodiments of the present technology, the processor 110 may further be configured to determine the other predetermined signal augmentation pattern (not separately depicted) following the same procedure as described above in respect of the predetermined signal augmentation pattern 410. To that end, the processor 110 may be configured to decode the information indicative of the type of the electronic device reproducing the audio file 230, thereby determining that the audio file 230 is being reproduced, specifically, by the second electronic device 206.

On the other hand, if the processor 110 has not determined that at least one of the first detection value and the second detection value exceeds the predetermined threshold value, the processor 110 may be configured to determine that the audio signal 240 has been generated in response to the user utterance 260. Accordingly, as previously described, the processor 110 may be configured to proceed to determine the presence, in the audio signal 240, of the predetermined wake up word associated with the virtual assistant application 205, using the speech-to-text algorithm as described above in respect of the virtual assistant application 205.

Once, the processor 110 has determined the presence of the predetermined wake up word in the audio signal 240, it may be configured to switch the first electronic device 204 from the first operating mode into the second operating mode, as described above in respect of the virtual assistant application 205.

Figure 8:
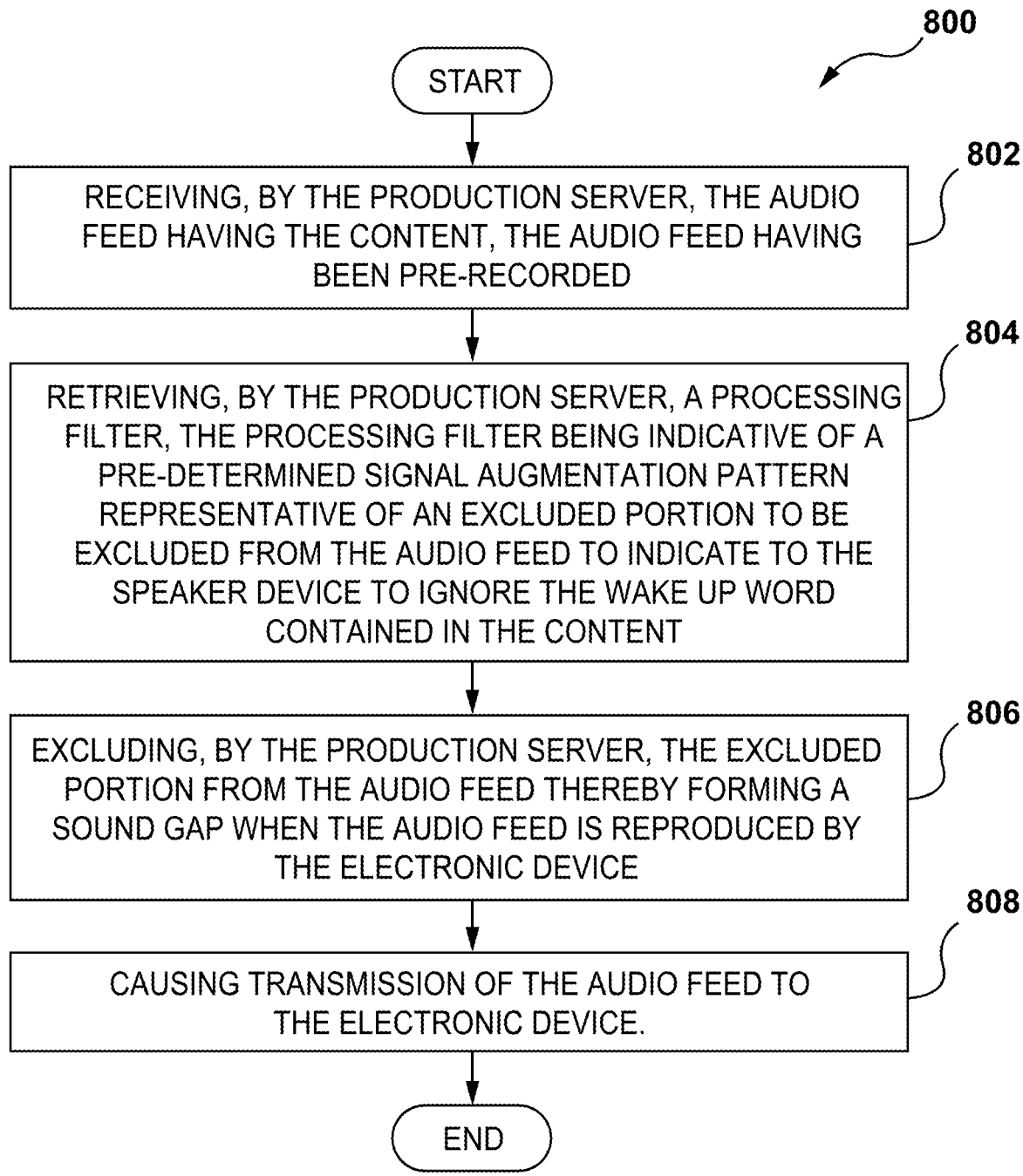
FIG. 8 depicts a flow chart of a method for generating, by the production server present in the networked computing environment of FIG. 2, an audio document, in accordance with the non-limiting embodiments of the present technology.

Given the architecture and the examples provided hereinabove, it is possible to execute a method for generating an audio feed (for example, the audio file 230). With reference now to FIG. 8, there is depicted a flowchart of a method 800, according to the non-limiting embodiments of the present technology. The method 800 is executable by the production server 214.

Step 802—Receiving, by the Production Server, the Audio Feed having the Content, the Audio Feed having Been Pre-Recorded The method 800 commences at step 802, where the production server 214 is configured to receive, over the communication network 208, for example, from one of the third-party media servers (not separately depicted), an audio feed (for example, the audio feed 215).

In some non-limiting embodiments of the present technology, the audio feed 215 have been pre-recorded to include an utterance of the predetermined wake up word associated with the virtual assistant application 205. In these embodiments, the audio feed may be processed by the production server for further transmitting, via the communication network 208, to electronic devices (for example, the second electronic device 206) for reproduction of a resulting audio file (for example, the audio file 230).

As described above, the predetermined wake up word is used to activate the virtual assistant application 205, that is, when the processor 110 of the first electronic device 204 causes the first electronic device 204 to switch from the first operating mode into the second operating mode for receiving voice commands from the user 216 for execution, as described above with respect to the virtual assistant application 205.

In some non-limiting embodiments of the present technology, the production server 214 may be configured to pre-process the audio feed 215 to generate an include therein a predetermined signal augmentation pattern (for example, the signal augmentation pattern 410), thereby generating the audio file 230, that is to indicate to electronic devices running the virtual assistant application 205 (for example, the first electronic device 204) to ignore the predetermined wake up word contained in the audio file 230 when it is reproduced (played back) in the vicinity (for example, the vicinity 250) of those electronic devices.

To that end, in some non-limiting embodiments of the present technology, upon receiving the audio feed 215, first, the production server 214 is configured to generate the initial amplitude-time representation 302 thereof, as described in detail above with reference to FIG. 3.

Further, according to the non-limiting embodiments of the present technology, the production server 214 may be configured to generate the initial time-frequency representation 304 of the audio feed 215 by applying the Short-Time Fourier Transform (STFT) with a predetermined time window (for example, the time window 306) to the initial amplitude-time representation 302, as described above with reference to FIG. 3.

Step 804—Retrieving, by the Production Server, a Processing Filter, the Processing Filter being Indicative of a Pre-Determined Signal Augmentation Pattern Representative of an Excluded Portion to be Excluded from the Audio Feed to Indicate to the Speaker Device to Ignore the Wake Up Word Contained in the Content At step 804, having generated the initial time-frequency representation 304 of the audio feed 215, the production server 214 may be further configured to retrieve and apply thereto one or more signal processing filters (for example, the signal processing filter 220). According to the non-limiting embodiments of the present technology, the production server 214 may be configured to receive, via the communication network 208, the signal processing filter 220 from the server 202 communicatively coupled to the filter database 212.

In some non-limiting embodiments of the present technology, the signal processing filter 220 is a notch filter configured to remove (or otherwise exclude) at least one predetermined frequency level (for example, the frequency level 403) from an audio signal, to which it is applied to.

In other non-limiting embodiments of the present technology, the signal processing filter 220 may be a plurality of notch filters indicative of a plurality of predetermined frequency levels (for example, the plurality of predetermined frequency levels 404) to be excluded from the audio signal, to which it is applied to. To that end, the server 202, before transmitting the signal processing filter 220 to the production server 214, has been configured to select the plurality of predetermined frequency levels 404.

In the non-limiting embodiments, the server 202 is configured to select each one of the plurality of predetermined frequency levels 404 from the range of human hearing frequency levels.

In some non-limiting embodiments of the present technology, the server 202 is configured to select the plurality of predetermined frequency levels 404 such that they are not divisible by each other (that is, such that no one of the plurality of the predetermined frequency levels 404 is a multiple of any other one of them).

Further, in some non-limiting embodiments of the present technology, the server 202 may be configured to select each one of the plurality of predetermined frequency levels 404 randomly from a predetermined distribution of frequency levels from the range of human hearing frequency levels. In these embodiments, the predetermined distribution of frequency levels from the range of human hearing frequency levels may be a uniform probability distribution thereof.

In certain non-limiting embodiments of the present technology, the plurality of predetermined frequency levels 404 includes 8 (eight) frequency levels:
 486 Hz;
 638 Hz;
 814 Hz;
 1355 Hz;
 2089 Hz;
 2635 Hz;
 3351 Hz;
 4510 Hz.

Step 806—Excluding, by the Production Server, the Excluded Portion from the Audio Feed Thereby Forming a Sound Gap when the Audio Feed is Reproduced by the Electronic Device At step 806, having retrieved the signal processing filter 220, the production server 214 is configured to apply it to at least one time window 306 of the initial time-frequency representation 304 of the audio feed 215. In alternative non-limiting embodiments of the present technology, the production server 214 may be configured to apply the signal processing filter 220 to each time window 306 stacked along the time axis of the initial time-frequency representation 304.

According to the non-limiting embodiments of the present technology, by applying the signal processing filter 220 to the initial time-frequency representation 304, the production server 214 is configured to generate (or otherwise "cut out") a the predetermined signal augmentation pattern 410 therein, thereby generating the refined time-frequency representation 402 of the audio feed 215, as described above with reference to FIG. 4.

Further, according to the non-limiting embodiments of the present technology, the production server 214 is configured to restore, based on so-generated refined time-frequency representation 402 of the audio feed 215, the refined amplitude-time representation 502 for the audio file 230. As such, the audio file 230 is ready to be transmitted over the communication network 208 in response to a request from an electronic device (such as the second electronic device 206).

Thus, when the audio file 230 is played back by the second electronic device 206 in the vicinity 250, the predetermined signal augmentation pattern 410, when recognized by the first electronic device 204, indicates to the first electronic device 204 to ignore the predetermined wake up word associated with the virtual assistant application 205, the utterance of which has been included in the audio file 230.

In some non-limiting embodiments of the present technology, following the procedure above with respect to generating the predetermined signal augmentation pattern 410, the production server 214 may retrieve another signal processing filter, for example, from the server 202, to generate another predetermined signal augmentation pattern (not separately depicted). The other signal augmentation pattern may be used, by the production server, for example, to encode, in the audio file 230, information indicative of an electronic device, by which the audio file 230 is to be reproduced.

Thus, by applying the signal processing filter 220 to the initial time-frequency representation 304 of the audio feed 215, the production server 214 is configured to generate the audio file 230, which, when reproduced by the second electronic device 206, includes sound gaps, within at least one time window 306, corresponding to respective ones from the plurality of predetermined frequency levels 404.

According to the non-limiting embodiments of the present technology, the plurality of predetermined frequency levels 404 has been selected, by the server 202, in such a way that the so-generated sound gaps in the audio file 230 may be substantially unrecognizable by the human hearing.

Step 808—Causing Transmission of the Audio Feed to the Electronic Device

At step 808, the production server 214 may be configured to transmit, via the communication network 208, the audio file 230 including at least one predetermined signal augmentation pattern, that is the signal augmentation pattern 410, to an electronic device (for example, the second electronic device 206) for further reproduction thereat.

The method 800 hence terminates.

Figure 9:
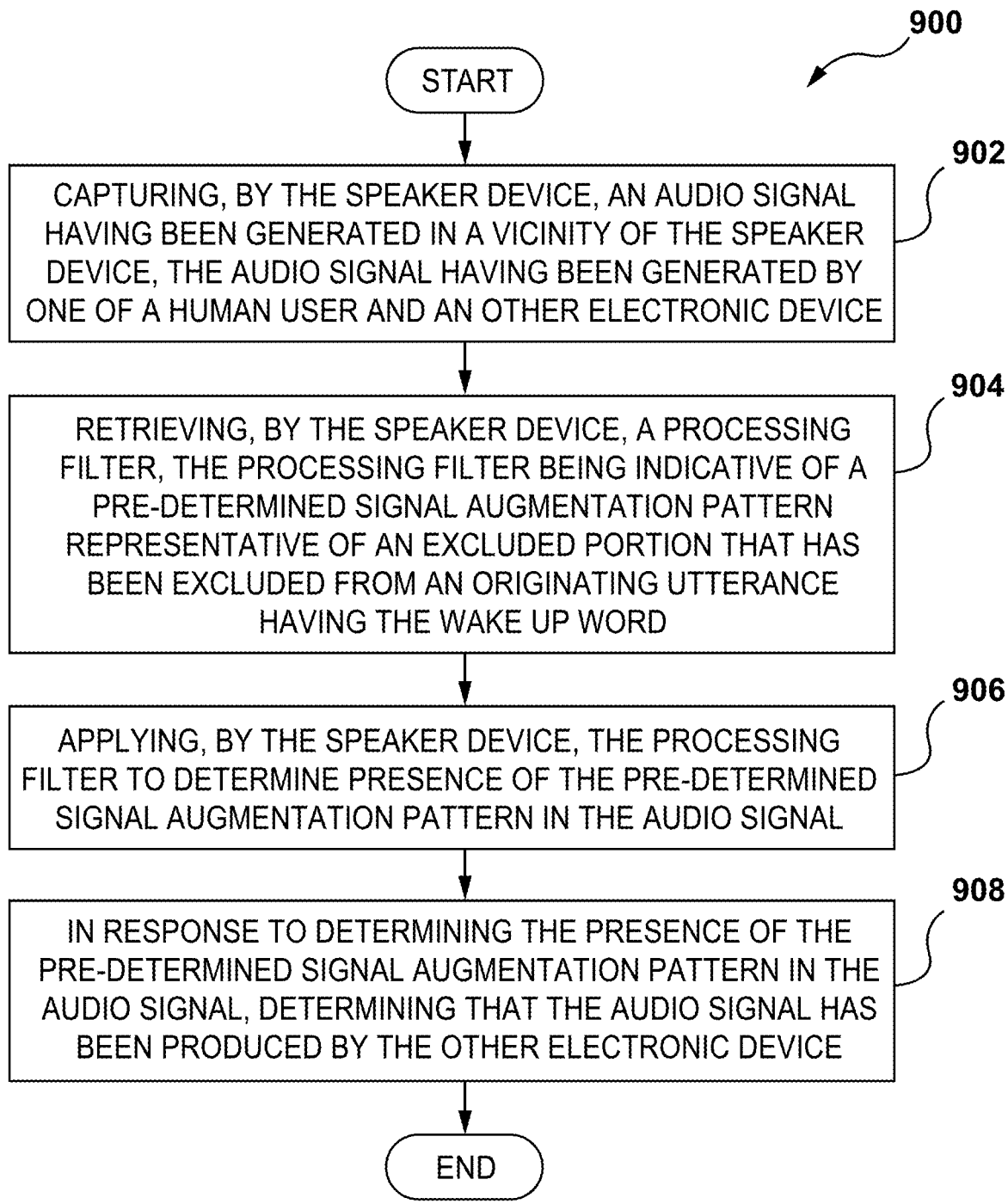
FIG. 9 depicts a flow chart of a method for operating an electronic device present in the networked computing environment of FIG. 2, an audio document, in accordance with the non-limiting embodiments of the present technology.

Given the architecture and the examples provided hereinabove, it is possible to execute a method for operating a speaker device (for example, the first electronic device 204). With reference now to FIG. 9, there is depicted a flowchart of a method 900, according to the non-limiting embodiments of the present technology. The method 900 is executable by the processor 110 (such as the processor 110 of the first electronic device 204 or the server 202).

Step 902—Capturing, by the Speaker Device, an Audio Signal Having been Generated in a Vicinity of the Speaker Device, the Audio Signal Having been Generated by One of a Human User and an Other Electronic Device The method 900 commences at step 902, where the first electronic device 204 is operated in the first operating mode waiting to receive the predetermined wake up word associated with the virtual assistant application 205 to activate the virtual assistant application 205 for receiving voice commands.

To that end, according to the non-limiting embodiments of the present technology, the microphone 207 of the first electronic device 204 is configured to capture any sound produced in the vicinity 250 of the first electronic device 204 and generate an audio signal (for example, the audio signal 240) for further processing.

Thus, the audio signal 240 may be generated for example, by the microphone 207, in response either to a user utterance (for example, the user utterance 260) of the user 216, or the second electronic device 206 reproducing audio content (for example, the audio file 230 received form the production server 214).

Accordingly, in the non-limiting embodiments of the present technology, having received the audio signal 240, the processor 110 is configured to establish the origin thereof by determining presence therein of a predetermined signal augmentation pattern (for example, the predetermined signal augmentation pattern 410).

Before further processing, according to the non-limiting embodiments of the present technology, the processor 110 may be configured to generate the reproduction amplitude-time representation 602 of the audio signal 240, as described in detail above with reference to FIG. 6. Further, based on the reproduction amplitude-time representation 604, by applying the STFT with the time window 306, the processor 110 is configured to generate the reproduction time-frequency representation 604 of the audio signal 240.

The method 900 further advances to step 904.

Step 904—Retrieving, by the Speaker Device, a Processing Filter, the Processing Filter being Indicative of a Pre-Determined Signal Augmentation Pattern Representative of an Excluded Portion that has been Excluded from an Originating Utterance Having the Wake Up Word At step 904, in order to determine the presence of the predetermined signal augmentation pattern 410 in the audio signal 240, first, the processor 110 is configured to retrieve a signal processing filter used for generating the predetermined signal augmentation pattern 410. In this regard, the processor 110 may be configured to retrieve, from the server 202, an indication of the signal processing filter 220 including an indication of the plurality of predetermined frequency levels 404.

The method 900 then advances to step 906.

Step 906—Applying, by the Speaker Device, the Processing Filter to Determine Presence of the Pre-Determined Signal Augmentation Pattern in the Audio Signal At step 906, the processor 110 is configured to determine, based on the received indication of the plurality of predetermined frequency levels 404, the presence, in the audio signal 240, of the predetermined signal augmentation pattern 410.

To that end, according to the non-limiting embodiments of the present technology, the processor 110 is configured to determine, at least within one time window 306, respective energy levels of the signal 240 corresponding to the plurality of the predetermined frequency levels 404, as described in detail above with reference to FIG. 7.

For example, based on the reproduction time-frequency representation 604 of the audio signal 240, the processor 110 may be configured to determine an energy level of the audio signal 240 at a given of the plurality of predetermined frequency levels 404 and respective energy levels at two, adjacent thereto, frequency levels—an upper adjacent frequency level and a lower adjacent frequency level. The processor 110 may be configured to calculate respective first and second differences between the energy level at the given one of the plurality of predetermined frequency levels 404 and each of the energy levels corresponding to the lower and upper adjacent frequency levels.

Thus, the processor 110 may be configured to determine the first detection value as a sum over the respective first differences corresponding to each of the plurality of predetermined frequency levels 404, and the second detection value as a sum over the respective second differences corresponding to each of the plurality of predetermined frequency levels 404.

In alternative embodiments of the present technology, the processor 110 may be configured to determine the first detection value and the second detection value by determining (1) a base frequency sum over the energy levels determined at each one of the plurality of predetermined frequency levels 404; (2) a lower adjacent frequency sum over energy levels determined at respective lower adjacent frequency levels to each one of the plurality of predetermined frequency levels 404; and (3) an upper adjacent frequency sum over energy levels determined at respective upper adjacent frequency levels to each one of the plurality of predetermined frequency levels 404. In these embodiments, the processor 110 may further be configured to generate logarithmic values of the base frequency sum, the lower adjacent frequency sum, and the upper adjacent frequency sum. Further, the processor 110 may be configured to determine the first detection value as a difference between the base frequency sum and the lower adjacent frequency sum; and the second detection value as a difference between the base frequency sum and the upper adjacent frequency sum.

In some non-limiting embodiments of the present technology, the processor 110 is configured to determine the first detection value and the second detection value within at least one time window 306 of the reproduction time-frequency representation 604 of the audio signal 240. In other non-limiting embodiments of the present technology, the processor 110 is configured to determine the first detection value and the second detection value within each time window 306 stacked along the time axis of the reproduction time-frequency representation 604 of the audio signal 240.

In the non-limiting embodiments of the present technology, the processor 110 is further configured to compare one of the first detection value and the second detection value with the predetermined threshold value. In some non-limiting embodiments of the present technology, the processor 110 is configured to compare the maximal one of the first detection value and the second detection value with the predetermined threshold value.

Step 908—in Response to Determining the Presence of the Pre-Determined Signal Augmentation Pattern in the Audio Signal, Determining that the Audio Signal has been Produced by the Other Electronic Device At step 908, according to the non-limiting embodiments of the present technology, in response to one of the first detection value and the second detection value being above the predetermined threshold value, the processor 110 determines the presence of the predetermined signal augmentation pattern 410 in the audio signal 240. Accordingly, the processor 110 is configured to determine that the audio signal 240 was generated, by the microphone 207, in response to the second electronic device 206 reproducing the audio file 230. In this regard, the processor 110 is configured to discard the audio signal 240 from further processing to determine the presence therein of the predetermined wake up word associated with the virtual assistant application 205.

Instead, the processor 110 may be configured to execute a predetermined additional action, such as, without being limited to, causing the first electronic device 204 to produce a predetermined sound signal, or causing the first electronic device 204 to flash at least one of LEDs (not separately depicted) on the body thereof, or a combination of these actions.

In some non-limiting embodiments of the present technology, following determining the presence, in the audio signal 240, of the predetermined signal augmentation pattern 410, the processor 110 may be configured to determine the presence therein of the other predetermined signal augmentation pattern. As previously described, the other predetermined signal augmentation pattern may be indicative of a type of the electronic device which has triggered the generation, by the microphone 207, of the audio signal 240. To that end, the processor 110 may be configured to determine that the audio signal 240 has been generated in response to reproduction of the audio file 230 specifically by the second electronic device 206, that is, for example, according to the depicted embodiments of FIG. 2, a TV set.

Conversely, in response to neither of the first detection value or the second detection value being above the predetermined threshold value, the processor 110 is configured to determine that the audio signal 240 has been generated, by the microphone 207, in response to the user utterance 260.

In this regard, the processor 110 is further configured to determine the presence, in the audio signal 240, of the predetermined wake up word associated with the virtual assistant application 205. To that end, as previously described, the processor 110 is configured to apply, at the first electronic device 204, the speech-to-text algorithm to the audio signal 240 to generate a text representation thereof. Further, the processor 110 is configured to process the text representation of the audio signal to determine the presence therein of the predetermined wake up word associated with the virtual assistant application 205.

In response to determining the presence, in the text representation of the audio signal 240, the predetermined wake up word, the processor 110 is configured to switch the first electronic device 204 from the first operating mode into the second operating mode.

According to the non-limiting embodiments of the present technology, in the second operating mode, the first electronic device 204 is configured to receive a voice command from the user 216 to execute, for example, one of the plurality of service applications 209. To that end, the processor 110 may be configured to generate a data packet associated with the received voice command and transmit it to the server 202 for further processing to determine, for example, which of the plurality of service applications 209 is associated with the received voice command of the user 216.

In contrast, if the processor 110 has not determined the presence of the predetermined wake up word in the text representation of the audio signal 240, the processor 110 causes the first electronic device 204 to remain in the first operating mode.

The method 900 hence terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for operating a speaker device, the speaker device being associated with a first operating mode and a second operating mode, the speaker device being further associated with a pre-determined wake up word, the pre-determined wake up word being configured, once recognized by the speaker device being in the first operating mode, to cause the speaker device to switch into the second operating mode;
the method being executable by the speaker device, the method comprising:
capturing, by the speaker device, an audio signal having been generated in a vicinity of the speaker device, the audio signal having been generated by one of a human user and an other electronic device;
retrieving, by the speaker device, a processing filter, the processing filter being indicative of a pre-determined signal augmentation pattern representative of an excluded portion that has been excluded from an originating utterance having the wake up word,
the originating utterance to be reproduced by the other electronic device;
applying, by the speaker device, the processing filter to determine presence of the pre-determined signal augmentation pattern in the audio signal;
in response to determining the presence of the pre-determined signal augmentation pattern in the audio signal, determining that the audio signal has been produced by the other electronic device.

2. The method of claim 1, wherein the method further comprises, in response to determining the presence of the pre-determined signal augmentation pattern in the audio signal:
discarding the audio signal from further processing.

3. The method of claim 1, wherein the method further comprises, in response to determining the presence of the pre-determined signal augmentation pattern in the audio signal:
executing a pre-determined additional action other than processing the audio signal to determine presence of the pre-determined wake up word therein.

4. The method of claim 1, wherein in response to not determining the presence of the pre-determined signal augmentation pattern in the audio signal, the method further comprising:
determining that the audio signal has been produced by the human user;
applying, by the speaker device, a speech-to-text algorithm to the audio signal to generate a text representation thereof;
processing, by the speaker device, the text representation to determine presence of the wake up word therein;

in response to determining the presence of the wake up word, switching the speaker device onto the second operating mode.

5. The method of claim 1, wherein the signal augmentation pattern is associated with one of pre-determined frequency levels.

6. The method of claim 5, wherein the signal augmentation pattern is associated with a plurality of pre-determined frequency levels, the plurality of pre-determined frequency levels being selected from a spectrum recognizable by a human ear.

7. The method of claim 5, wherein the plurality of pre-determined frequency levels are such that they are not divisible by each other.

8. The method of claim 5, wherein the signal augmentation pattern is associated with a plurality of pre-determined frequency levels, the plurality of pre-determined frequency levels being selected from a spectrum recognizable by a human ear and being not divisible by each other.

9. The method of claim 5, wherein the plurality of pre-determined frequency levels are randomly selected.

10. The method of claim 9, wherein the plurality of pre-determined frequency levels are randomly pre-selected.

11. The method of claim 5, wherein the plurality of pre-determined frequency levels comprises:
486 Hz
638 Hz
814 Hz
1355 Hz
2089 Hz
2635 Hz
3351 Hz
4510 Hz.

12. The method of claim 11, wherein the pre-determined signal augmentation pattern is a first pre-determined signal augmentation pattern and wherein the method further comprises receiving an indication of a second pre-determined signal augmentation pattern, different from the first pre-determined signal augmentation pattern.

13. The method of claim 12, wherein the second pre-determined signal augmentation pattern is for indicating a type of the other electronic device.

14. The method of claim 1, wherein the first operating mode is associated with local speech to text processing, and the second operating mode is associated with a server-based speech to text processing.

15. The method of claim 1, wherein the other electronic device is located in the vicinity of the speaker device.

16. The method of claim 1, wherein exclusion of the excluded portion forms a sound gap when the originating utterance is reproduced by the other device, the sound gap being substantially un-recognizable by a human ear.

17. The method of claim 1, wherein the applying the processing filter comprises first processing the audio signal into time-frequency representation thereof.

18. The method of claim 17, wherein the processing the audio signal comprises applying a Fourier transformation.

19. The method of claim 18, wherein the applying the Fourier transformation is executed by a stacked window approach.

20. The method of claim 19, wherein the applying, by the speaker device, the processing filter is executed for each of the stacked windows.

21. The method of claim 20, wherein the determining the presence of the pre-determined signal augmentation pattern in the audio signal is in response to the presence of the pre-determined signal augmentation pattern in at least one of the stacked windows.

22. The method of claim 1, wherein the applying the processing filter to determine the presence of the pre-determined signal augmentation pattern in the audio signal comprises determining energy levels in a plurality of pre-determined frequencies where sound has been filtered out.

23. The method of claim 22, wherein the determining energy levels comprises comparing an energy level at a given one of the plurality of pre-determined frequencies where sound has been filtered out to an energy level in an adjacent frequency where the sound has not been filtered out.

24. The method of claim 23, wherein the presence of the pre-determined signal augmentation pattern is determined in response to a difference between energy levels being above a pre-determined threshold.

25. A computer-implemented method for generating an audio feed for transmitting to an electronic device for audio-processing thereof, the audio feed having a content that includes a pre-determined wake up word, the pre-determined wake up word being configured, once recognized by a speaker device being in a first operating mode, to cause the speaker device to switch into a second operating mode from the first operating mode, the method being executable by a production server, the method comprising:
receiving, by the production server, the audio feed having the content, the audio feed having been pre-recorded;
retrieving, by the production server, a processing filter, the processing filter being indicative of a pre-determined signal augmentation pattern representative of an excluded portion to be excluded from the audio feed to indicate to the speaker device to ignore the wake up word contained in the content;
excluding, by the production server, the excluded portion from the audio feed thereby forming a sound gap when the audio feed is reproduced by the electronic device;
causing transmission of the audio feed to the electronic device.

* * * * *